United States Patent

[11] 3,633,509

| [72] | Inventors | Andrew J. Grandy<br>North Hills;<br>Sidney Goldstein, Philadelphia, both of Pa. |
|---|---|---|
| [21] | Appl. No. | 862,212 |
| [22] | Filed | Sept. 30, 1969 |
| [45] | Patented | Jan. 11, 1972 |
| [73] | Assignee | The United States of America as represented by the Secretary of the Army |

[54] REACTIONLESS FLARE-LAUNCHING APPARATUS
7 Claims, 5 Drawing Figs.

[52] U.S. Cl................................................. 102/35.4,
  89/1.7, 102/35.6
[51] Int. Cl................................................F42b 25/04,
  F42b 13/38
[50] Field of Search............................................ 102/35;
  89/1.7, 1.702

[56] References Cited
UNITED STATES PATENTS
| 2,044,024 | 6/1936 | Wiley.......................... | 102/35.2 |
| 2,979,991 | 4/1961 | Buschers et al.............. | 89/1.7 |
| 3,499,385 | 3/1970 | Douda.......................... | 102/35 |

FOREIGN PATENTS
| 125,126 | 1919 | Great Britain................ | 89/1.702 |
| 6,344 | 1915 | Great Britain................ | 89/1.7 A |

Primary Examiner—Robert F. Stahl
Attorneys—Harry M. Saragovitz, Edward J. Kelly, Herbert Berl and S. Dubroff ABSTRACT: A reactionless flare-launching apparatus having two spaced-apart, frangibly secured together pistons located within an open-ended elongated tube, is mounted transversely to an aircraft longitudinal axis. Two flares, positioned within the tube outwardly of the pistons, are urged out of the tube away from the aircraft after a predetermined gas pressure, applied in the tube between the pistons, breaks the frangible securing element and permits the pistons and flares to be ejected laterally from the aircraft.

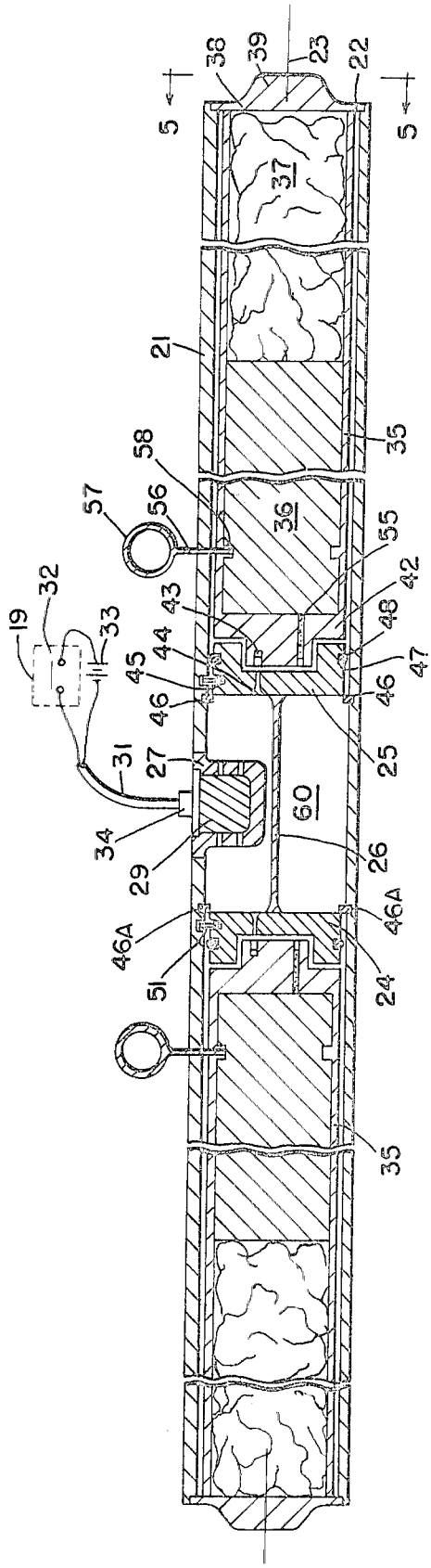
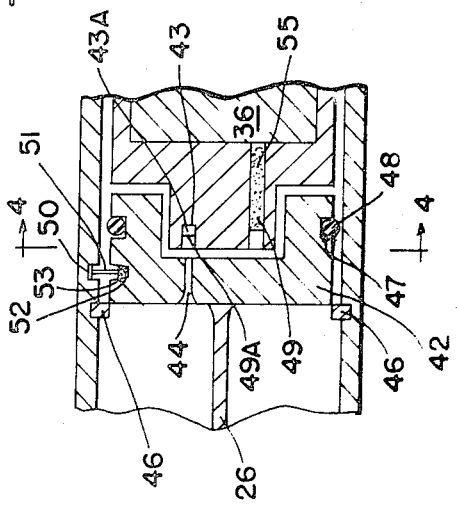

INVENTORS:
ANDREW J. GRANDY
SIDNEY GOLDSTEIN

REACTIONLESS FLARE-LAUNCHING APPARATUS

The invention described herein may be manufactured, used, and licensed by or for the Government for governmental purposes without the payment to us of any royalty thereon.

The increased utilization of rotary-wing aircraft in combat support operations in recent years has amplified a problem associated with the jettisoning of parachute-supported ordnance items. Little imagination is needed to appreciate the safety hazard concomitant with the presence in close proximity of rapidly whirling rotor blades and parachute shrouds. At present, the para-dropping of ordnance items such as flares, is accomplished manually with reliance being placed solely on the force of gravity to provide adequate spacing between the aircraft and the flare when the parachute opens. Considering the vagaries of flight through turbulent air, this reliance is misplaced. Also, with the present manual-dropping technique, the aircraft commander is unable to jettison the complete flare load in the event of an emergency. This imposes an additional hazard upon operating personnel which is obviated by this invention.

It is, therefore, an object of this invention to provide an apparatus for safely launching illuminating flares from rotary-wing aircraft.

It is another object of this invention to provide a reactionless flare-launching apparatus for use in aircraft and which is capable of rapidly and completely jettisoning flares while in flight.

These objects are achieved in the present invention by providing an aircraft with an open-ended elongated tube which is mounted transversely to the aircraft longitudinal axis and which contains two spaced-apart pistons which are secured together by a cordlike frangible element. A predetermined gas pressure, applied in the tube between the pistons, breaks the frangible element and urges the pistons and flares outwardly of the tube at a preselected uniform velocity. Use of an open-ended tube with a centrally located gas-producing charge in combination with the cordlike frangible element provides the essentials required to uniformly ignite and burn the propelling charge. Uniform ignition and burning is essential in open-ended tube launching devices. This is achieved by placement of masses of equal or unequal weights on both sides of the gas-producing charge. Recoillessness is inherent in the system because of the open-ended condition of the tube. There is no reaction on open-ended tubes which must be counterbalanced. The masses on each side of the propellant charge provide a temporary closure to achieve uniformity of ballistics. Discharge of the flares from the aircraft in this manner, also ensures adequate spacing between the aircraft and the flares, and provides a rapid reactionless means for quickly jettisoning a complete flare load in the event of an emergency.

These and other objects, features and advantages will become apparent from the following specification taken in conjunction with the accompanying drawings in which:

FIG. 2 is an enlarged, longitudinal cross-sectional view of one of the flare-launching tubes of FIG. 1.

FIG. 3 is an enlarged, fragmentary, longitudinal cross-sectional view of one of the flare-launching pistons of FIG. 2.

Figure 5:
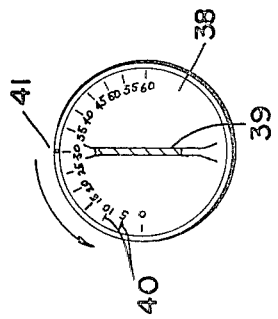
FIG. 5 is a cross-sectional view taken along line 5—5 of FIG. 2 and showing a time-graduated flare end plate with an integral handle.

A rotary-wing aircraft shown generally at 10 (FIG. 1) has a cockpit 11 and a boom 12 which extends rearwardly of the cockpit along the central longitudinal axis 13. Positioned within cockpit 11 rearwardly of the pilot's seat and transversely to axis 13, is a battery of flare-launching tubes 14 which are secured to aircraft 17 by tiedown cords 18 which are connected to clamps or retainers 16. Launching apparatus 14 is arranged within cockpit 11 such that the launch tube open ends will be pointed away from axis 13 to directing the flare through opening or doorway 15. As will be more fully discussed later in the specification, the flare-launching apparatus has a control console 19 located within the pilot's compartment and which is connected to the flare-launching apparatus by means of conduit 20.

Referring now to FIG. 2, it may be seen that each of the flare-launching tubes contained within battery 14 comprises a elongated open-ended tube 21 having a central longitudinal axis 23. Threadedly or otherwise fixedly secured to the center of tube 21 is a cup or container 27 which has a plurality of apertures 30 formed therein. Cup 27 contains a pyrotechnic gas-generating mixture 29 which may be either percussively or electrically initiated. In the preferred embodiment a conventional electrical initiator 34 is secured to cup 27 and is connected to power supply 33 and pushbutton switch 32 by means of insulated cable or conductor 31. Switch 32 is mounted within control console 19 in the pilot's compartment with one button actuating the launching apparatus in each launch tube. As one skilled in the art would readily perceive, initiators 34 may be wired in such a manner as to permit simultaneous initiation thereof by depressing a single pushbutton which may be located in console 19. This arrangement would permit the aircraft commander to jettison the complete flare load should an emergency condition arise.

Centrally positioned within tube 21 outwardly of cup 27 are two pistons 24 and 25. Pistons 24 and 25 are secured together by means of frangible element or cord 26 which is firmly secured thereto and which extends along longitudinal axis 23. Cord 26 is preferably made from steel, with the diameter thereof being adjusted to cause the cord to yield or break upon the application of a predetermined gas pressure within chamber 60.

Pistons 24 and 25 are maintained in a longitudinally spaced-apart position by the presence of split rings 46 and 46A which act upon the interior peripheral surfaces thereof. Split rings 46 and 46A are of the conventional radially expanding type and are positioned within chamber 60 before cup 27 is screwed into place. Because of the symmetrical nature of the launch tube reference will now be made only to the right-hand side, it being understood that the same description applies to the left-hand side equally as well.

Figure 4:
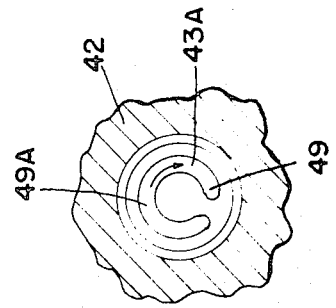
FIG. 4 is a fragmentary cross-sectional view taken along line 4—4 of FIG. 3 and depicting the arcuately shaped pyrotechnic timer and flare initiator.

Slidably positioned within tube 21 outwardly of piston 25 is a flare having a casing 35 with a pyrotechnically initiated candle portion 36 and a parachute 37 secured thereto for controlling the rate of descent of candle 36. Integral with flare casing 35 and adjacent to candle 36 is inner end 42 which is in contact with piston 25. Piston 25 has an aperture 44 (FIGS. 2,3) which extends longitudinally outwardly from chamber 60 and which is radially offset from longitudinal axis 23. An inwardly facing arcuate groove 43, (FIG. 4), formed within flare end 42, contains a pyrotechnic time delay mixture 43A. Arcuate groove 43 is formed so that fugitive initiation point 49A may be positioned in registry with aperture 44 in piston 25. Time delay mixture 43A communicates with candle 36 at end 49 through pyrotechnic train 55. Thus, it can be seen that the time delay or burning time of mixture 55 is increased as point 49A is displaced from end point 49, and increased conversely. Such displacement is effected in this invention by rotating flare casing 35 and train 43A with respect to aperture 44. To facilitate this rotation, flare casing 35 is provided with a handle 39 which is integral with a flare end cap 38 secured to flare casing 35 at the outer end of elongated tube 21. Flare 38 has a plurality of radial graduations 40 (FIG. 5) inscribed therein which correspond to various time intervals that an operator may wish to have elapse before the candle is ignited. A notch or groove 41, inscribed within the outermost base of tube 21, provides a visual reference point for setting the desired time intervals. Rotation of handle 39 in the direction of arrow 60 will increase the time interval from the 30-second mark as shown in FIG. 5 to any greater amount, with rotation in the direction opposite to arrow 60 decreasing the time interval.

In order to maintain aperture 34 of piston 25 in a fixed position in relationship to elongated tube 21, an antirotation device 45 is provided. This device includes a helical compression spring 53 positioned within a radial cavity 52 formed in piston 25. A pin 51 is positioned partially within cavity 52 and is biased radially outwardly thereof by spring 53. A portion of pin 51 engages a mating surface in bore or recess 50. Engagement between pin 51 and recess 50 will maintain piston 25 and aperture 44 in a fixed position in relationship to tube 21 thereby permitting arcuate time train 43A to be rotated relative to the aperture. Pin 51, designed to shear off upon the application of a predetermined gas pressure on piston 25, thereby permits piston 25 and flare 35 to move outwardly from elongated tube 21.

An obturator or seal around the piston is provided by an O-ring 48 positioned within a circumferential groove 47. Groove 47 is formed within piston 25 outwardly from pin 51 to protect O-ring 48 from being damaged as the piston shears off pin 51.

A safety pin 57 has an elongated portion 56 which is slidably inserted within a bore within tube 21 and which engages surface 58 formed by an annular indentation within flare casing 35. Pin 57, constructed to firmly secure flare 35 within tube 21 against premature or inadvertent launching, may be removed by the aircraft commander or operator prior to mission departure.

Figure 1:
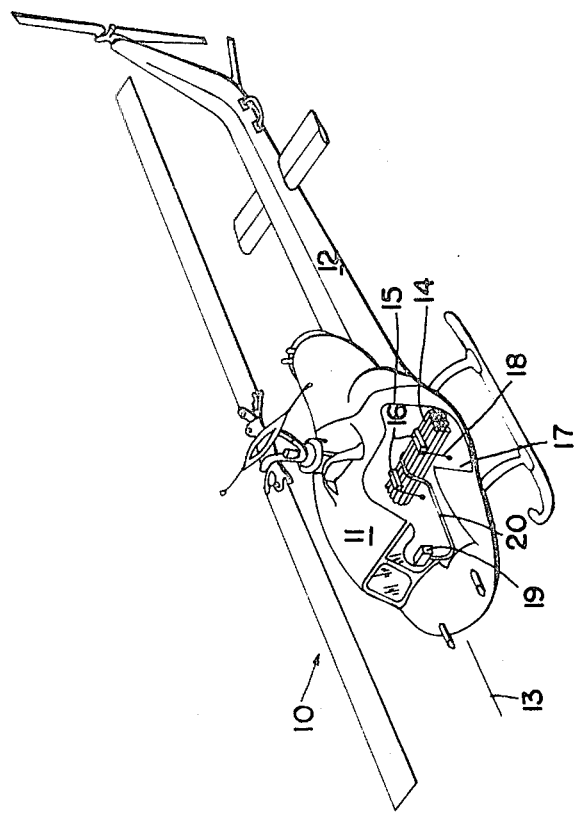
FIG. 1 is a perspective view of a rotary-wing aircraft with its cockpit partially broken away to show a flare-launching system embodying features of the invention.

The operation of the invention will now be described. A plurality of flare launch tubes 21 forming battery 14, are loaded on board aircraft 10 and securely fastened thereto by means of clamps and tiedown cords 18 as shown in FIG. 1. In this configuration the launched tube outer ends will face away from aircraft longitudinal axis 13 and will be positioned in alignment with door opening 15. The crew chief or aircraft commander may then set the flare timer to ignite the candle in accordance with the prescribed flare utilization procedures. For example, if the aircraft were to be flown over the drop zone at an altitude of, say, 10,000 feet, and it was desired that the flare candle be ignited at 5,000 feet above ground level, then the time could be set by rotating handle 39 until the time, corresponding with the drop-ignition altitude differential, is aligned with notch 41 on tube 21. Rotation of handle 39 will cause arcuate pyrotechnic train 43A to be moved relative to aperture 44 with handle clockwise rotation decreasing the time intervals and counterclockwise rotation increasing them. After the flare timers have been set safety pins 57 are removed and the flare-launching apparatus is then in an armed condition.

When aircraft 10 arrives over the drop zone, the aircraft commander initiates the flare ejection apparatus by depressing button 32 which is mounted within console 19 in the pilot's compartment. The depression of button 32 will then cause current to flow from power supply 33 through conductor 31 to electrical initiator 34 and initiation of pyrotechnic mixture 29 within cup 27 will take place. Gases generated by the initiation of mixture 29 will flow through apertures 30 and into chamber 60. A small portion of these gases will be bled into aperture 44 in piston 25 and will communicate with and ignite pyrotechnic timing mixture 43A at fugitive ignition point 49A. The complete combustion of pyrotechnic mixture 29 will cause the pressure within chamber 60 to increase, and when a predetermined pressure has been reached, frangible element 26 will break and pistons 24 and 25 will begin to move outwardly of tube 21. MOvement of the pistons will shear pin 51 permitting the pistons and flares to accelerate rapidly within tube 21. Because of the symmetry inherent in the invention, the velocity of each flare as it leaves the open ends of tubes 21 will be approximately equal. Thus, reaction forces on the aircraft structure are minimized and, at the same time, the flares are expelled outwardly and away from the aircraft at a velocity which is sufficient to enable them to clear the aircraft rotors before the flare parachute begins to open.

Simultaneously with the acceleration of pistons 24 and 25, the pyrotechnically generated gases which have been bled through typical aperture 44 ignite pyrotechnic time delay train 43A at fugitive initiation point 49A. The ignited point will then proceed along mixture 55 in arcuate path 43A toward end 49 to ignite candle 36. The ignition of candle 36 and the action of parachute 37 in controlling the rate of descent of the candle will illuminate the drop zone to facilitate observation therein.

Thus, it can be seen that an apparatus has been provided which will positively and safely launch flares from an aircraft by expelling the flares laterally from the craft at a velocity which will enable them to clear the aircraft structure before the flare parachute begins to open. Also, the flare-launching apparatus is provided with a mechanism which will enable an operator to quickly and accurately set the flare candle to ignite at a predetermined altitude above ground level.

We wish it to be understood that we do not desire to be limited to the exact details of construction shown and described, for obvious modifications will occur to a person skilled in the art.

We claim:

1. A reactionless flare-launching apparatus for use in an aircraft comprising:
   an open-ended elongated tube having a central longitudinal axis,
   piston means centrally positioned within said tube, said piston means including first and second longitudinally spaced-apart pistons defining a gas expansion chamber therebetween,
   a frangible member located within said tube between said pistons, said member being secured to said pistons and arranged to fail upon the application of a predetermined gas pressure in said chamber,
   illuminating flare means slidably positioned within said tube outwardly of said piston means, said flare means including first and second flares each having an inner end adjacent to said pistons, said flares arranged to slide longitudinally outward from said tube, and
   means for generating a gas pressure within said chamber in response to an operator's signal, said pressure being sufficient to break said frangible member and expel said flares from said tube in a direction away from said aircraft.

2. The launching apparatus of claim 1 wherein each inner end of said flares has a pyrotechnic timer contained therein, said timer including an arcuate explosive train positioned transversely to said tube longitudinal axis and having a preselected burning rate, said arcuate train having one end in contact with said flare for ignition thereof after a predetermined time interval; each of said pistons has means for preventing rotation thereof relative to said tube and each piston has an aperture therein in communication with said chamber and in registry with a portion of said arcuate explosive train for igniting said train by communicating therewith gases generated within said chamber; each of said flares has an outer end having grip means for manually rotating said flare through an arc relative to said tube and indicator means for determining the amount of flare rotation so that an operator may set each flare to ignite at a predetermined time interval by rotating said flare and said arcuate train relative to said piston aperture.

3. The launching apparatus as defined in claim 2 wherein said rotation-preventing means includes a pin slidably positioned within a radial cavity in said piston, and means within said cavity for biasing said pin radially outwardly thereof, said tube interior wall having a recessed surface portion in engagement with said pin.

4. The launching apparatus as recited in claim 1 wherein said tube is positioned transversely to a longitudinal axis of a rotary wing aircraft for ejecting said flares laterally therefrom.

5. The launching apparatus of claim 1 wherein said frangible member is an elongated metal cord coaxially aligned with said tube longitudinal axis.

6. The launching apparatus of claim 5 wherein said metal is steel.

7. The launching apparatus as defined in claim 1 wherein said gas-generating means includes a pyrotechnic mixture contained with a perforated cup secured centrally within said chamber.